United States Patent
Ndzebet et al.

(10) Patent No.: US 10,355,306 B2
(45) Date of Patent: Jul. 16, 2019

(54) HIGH RATE AND ENERGY CATHODE MATERIAL FOR LITHIUM BATTERIES

(75) Inventors: Ernest Ndzebet, Joplin, MO (US); Joshua Dean, Joplin, MO (US); Mario Destephen, Joplin, MO (US); Umamaheswari Janakiraman, Webb City, MO (US); Gregory Miller, Diamond, MO (US); Min Qi Yang, Webb City, MO (US)

(73) Assignee: EaglePicher Technologies, LLC, Joplin, MO (US)

(*) Notice: Subject to any disclaimer, the term of this patent is extended or adjusted under 35 U.S.C. 154(b) by 842 days.

(21) Appl. No.: 13/597,848

(22) Filed: Aug. 29, 2012

(65) Prior Publication Data

US 2013/0065137 A1 Mar. 14, 2013

Related U.S. Application Data

(60) Provisional application No. 61/532,386, filed on Sep. 8, 2011.

(51) Int. Cl.
| | |
|---|---|
| *H01M 4/131* | (2010.01) |
| *H01M 10/0525* | (2010.01) |
| *H01M 4/485* | (2010.01) |
| *H01M 4/505* | (2010.01) |
| *H01M 4/587* | (2010.01) |
| *H01M 2/16* | (2006.01) |
| *H01M 4/583* | (2010.01) |
| *H01M 10/04* | (2006.01) |

(52) U.S. Cl.
CPC ....... *H01M 10/0525* (2013.01); *H01M 2/162* (2013.01); *H01M 4/485* (2013.01); *H01M 4/505* (2013.01); *H01M 4/587* (2013.01); *H01M 4/5835* (2013.01); *H01M 10/0436* (2013.01)

(58) Field of Classification Search
CPC .............................. H01M 10/056; H01M 4/50
See application file for complete search history.

(56) References Cited

U.S. PATENT DOCUMENTS

| | | |
|---|---|---|
| 4,310,609 A | 1/1982 | Liang et al. |
| 5,180,642 A | 1/1993 | Weiss et al. |
| 5,639,577 A | 6/1997 | Takeuchi et al. |
| 5,667,916 A | 9/1997 | Ebel et al. |
| 5,670,276 A | 9/1997 | Takeuchi et al. |

(Continued)

FOREIGN PATENT DOCUMENTS

| | | |
|---|---|---|
| JP | A-61-142669 | 6/1986 |
| WO | WO 2010/054305 A1 | 5/2010 |
| WO | WO 2010/102239 A1 | 9/2010 |

OTHER PUBLICATIONS

Oct. 22, 2013 Office Action issued in Japanese Patent Application No. 2012-197623 w/translation.

(Continued)

*Primary Examiner* — Cynthia K Walls
(74) *Attorney, Agent, or Firm* — LSIP Law LLC; Linda Saltiel

(57) ABSTRACT

A cathode material suitable for use in non-aqueous electrochemical cells that includes copper manganese vanadium oxide and, optionally, fluorinated carbon. A non-aqueous electrochemical cell comprising such a cathode material, and a non-aqueous electrochemical cell that additionally includes a lithium anode.

17 Claims, 3 Drawing Sheets

X-RAY DIFFRACTION PATTERN OF CuMnVO OF EXAMPLE 3

(56) References Cited

U.S. PATENT DOCUMENTS

| | | |
|---|---|---|
| 7,476,467 B2 | 1/2009 | Park et al. |
| 2005/0003269 A1 | 1/2005 | Nanjundaswamy et al. |
| 2009/0004565 A1 | 1/2009 | Thackeray et al. |
| 2010/0310908 A1* | 12/2010 | Zhang .................. H01M 4/364 |
| | | 429/90 |

OTHER PUBLICATIONS

Feb. 27, 2014 Extended European Search Report issued in European Patent Application No. EP 12 18 3582.1.

* cited by examiner

X-RAY DIFFRACTION PATTERN OF CuMnVO OF EXAMPLE 3

DISCHARGE PROFILE OF CuMVO MATERIAL OF EXAMPLE 2

DISCHARGE PROFILE OF CuMVO MATERIAL OF EXAMPLE 3

DISCHARGE PROFILE OF CuMnVO/CF$_t$ BASED CELL

DISCHARGE PROFILE OF CF$_1$ BASED CELL

HIGH RATE AND ENERGY CATHODE MATERIAL FOR LITHIUM BATTERIES

BACKGROUND

The present disclosure generally relates to a cathode material suitable for use in non-aqueous electrochemical cells that comprise copper manganese vanadium oxide and, optionally, fluorinated carbon. The present disclosure additionally relates to non-aqueous electrochemical cells comprising such a cathode material and to such a non-aqueous electrochemical cell that additionally comprises a lithium anode.

Lithium electrochemical cells, which are more commonly referred to as batteries, are widely used in a variety of military and consumer products. Many of these products use high energy and high power batteries. Due in part to the miniaturization of portable electronic devices, it is desirable to develop even smaller lithium batteries with increased power capabilities and service life. One way to develop smaller batteries with increased power capabilities is to develop higher energy cathode materials.

One example of a high energy cathode material is fluorinated carbon (i.e., $CF_x$). $CF_x$ is often used with a lithium anode in non-rechargeable (primary) batteries for, among other things, military devices and implantable medical devices. $CF_x$ (where x=1.0) has a specific energy of about 860 mAh/g. Other examples of high energy cathode materials include silver vanadium oxide and manganese dioxide, which have specific energies of about 315 and 308 mAh/g, respectively.

The cathodes for rechargeable (secondary) batteries, such as Li ion batteries, generally have lower energy storage capabilities than primary battery cathodes. However, secondary batteries can typically be recharged several hundred times, which significantly reduces the lifetime cost as well as battery disposal costs. Examples of secondary battery cathodes used in Li ion batteries include lithium cobalt oxide, lithium iron phosphate, and lithium nickel cobalt oxide.

To satisfy the demands for longer lasting and/or smaller batteries, there continues to be a need for cathodes exhibiting higher energy, like primary batteries, with partial or full recharging capabilities, like secondary batteries, thus extending the battery's lifetime and effectively reducing the overall cost. Mixed cathode materials have been proposed as one possible approach for achieving such improved primary and/or secondary batteries. Other benefits of mixed cathode materials include enhancing the rate capability and/or stability of the cathode, while maintaining the energy density per unit weight and/or per unit volume. Approaches for achieving such benefits have typically involved mixing a high rate-capable cathode material with a high energy-density cathode material.

U.S. Pat. No. 7,476,467 discloses a cathode material for secondary lithium batteries. The cathode active material comprises a mixture of (A) a lithium manganese-metal composite oxide having a spinel structure and (B) a lithium nickel-manganese-cobalt composite oxide having a layered structure. The cathode active material is said to have superior safety and a long-term service life at both room temperature and high temperatures, due to improved properties of lithium and the metal oxide.

It is known to those skilled in the art that composite cathodes comprising fluorinated carbon with some metal oxide are used for the purpose of providing a battery with reduced voltage delay, improved rate capability, and low temperature performance. For example, U.S. Pat. No. 5,667,916 describes a battery having a cathode mixture of $CF_x$ and other materials including, for example, copper oxide, or mixtures of other materials. Similarly, U.S. Pat. No. 5,180,642 discloses electrochemical cells or batteries having a cathode mixture comprising manganese dioxide ($MnO_2$), carbon monofluoride ($CF_x$, where x=1), or mixtures of the two, and other additives selected from the group consisting of vanadium oxide, silver vanadate, bismuth fluoride, and titanium sulfide.

Copper vanadium oxide electrodes are well known in general for lithium batteries. For example, U.S. Pat. No. 4,310,609 discloses using an electrochemical cell having, as a positive electrode, a composite oxide matrix consisting of vanadium oxide chemically reacted with a group IB, IIB, IIIB, IVB, VB, VIB, VIIB, or VIIIB metal, such as copper oxide. U.S. Pat. No. 5,670,276 describes a non-aqueous electrochemical cell having a cathode of copper silver vanadium oxide, which is made from vanadium oxide combined with copper nitrate and silver oxide, or copper oxide and silver nitrate.

Although the energy density of the electrode materials described in both U.S. Pat. Nos. 4,310,609 and 5,670,276 is improved over some active materials, such as manganese oxide, there is still a great need to enhance the electrochemical proprieties and service life of copper-vanadium oxide based electrodes for lithium cells and batteries, particularly for use in combination with high energy density materials such as $CF_x$. We have now discovered that by using a simple and environmentally friendly chemical synthesis, manganese, copper, and vanadium may be combined to form a mixed oxide electrode with increased capacity and a desired discharge profile.

SUMMARY

One aspect is directed to a non-aqueous electrochemical cell. The cell comprises: (i) an anode; (ii) a cathode comprising copper manganese vanadium oxide; (iii) a separator disposed between the anode and the cathode; and (iv) a non-aqueous electrolyte that is in fluid communication with the anode, the cathode, and the separator.

Another aspect is directed to a non-aqueous electrochemical cell where the copper manganese vanadium oxide has the formula $Cu_xMn_yV_zO_w$, and (i) the copper therein has an oxidation state between about 1 and about 3; (ii) the manganese therein has an oxidation state between about 2 and about 7; (iii) the vanadium therein has an oxidation state between about 2 and about 5; (iv) x, y, and z each have a value greater than one or equal to zero; (v) the sum of x+y+z is between about 1 and about 3; and, (vi) w has a value greater than zero that may be experimentally determined and that is consistent with the values of x, y, and z and the oxidation states of copper, manganese, and vanadium.

Another aspect is directed to one of the foregoing non-aqueous electrochemical cells, wherein the cathode material additionally comprises fluorinated carbon.

Another aspect is directed to various electronic devices comprising such electrochemical cells.

It is to be noted that one or more of the additional features detailed below may be incorporated into one or more of the above-noted aspects, without departing from the scope of the present disclosure.

DETAILED DESCRIPTION OF EMBODIMENTS

Figure 1:
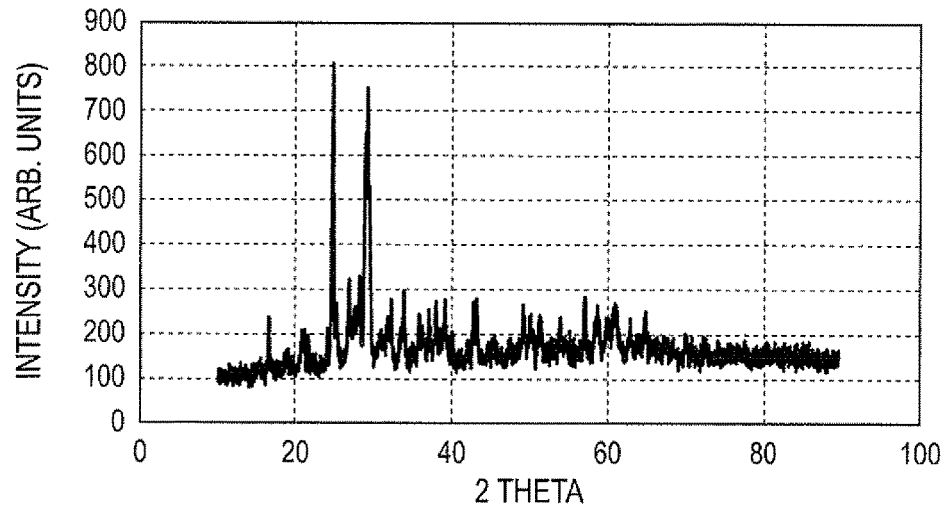
FIG. 1 illustrates an X-ray diffraction pattern of CuMnVO of Example 3.

1. Cathode Material Composition and Cell Components

One or more performance properties of a non-aqueous electrochemical cell may be improved or enhanced by using a cathode material comprising copper manganese vanadium oxide. In an embodiment, performance of such a non-aqueous cell may be improved or enhanced when the copper manganese vanadium oxide is used in combination with fluorinated carbon (i.e., $CF_x$).

As used herein, "non-aqueous" refers to an electrochemical cell that comprises or utilizes organic solvents and inorganic or organic salts as the electrolyte. There is no added water. That is, water is not added to the electrolyte as a separate or distinct component thereof. Nevertheless water may be present as a trace or underlying component or contaminant of the organic solvent(s) used to prepare the electrolyte. For example, in one or more non-limiting embodiments, the electrolyte may have a water content of less than about 1000 ppm, about 750 ppm, about 500 ppm, about 250 ppm, about 100 ppm, about 50 ppm, about 25 ppm, or even less.

An electrochemical cell may otherwise be referred to herein as a battery, a capacitor, a cell, an electrochemical device, or the like. It should be understood that these references are not limiting, and any cell that involves electron transfer between an electrode and an electrolyte is contemplated to be within the scope of the present disclosure.

"Improved" or "enhanced" performance properties generally refers to an improvement or enhancement in the specific energy, the energy density, the operating voltage, and/or the rate capability of a non-aqueous electrochemical cell, as compared, for example, to a non-aqueous electrochemical cell that is similarly prepared or designed but lacks the copper manganese vanadium oxide cathode material as detailed herein.

The copper manganese vanadium oxide cathode material may generally be represented by the formula $Cu_xMn_yV_zO_w$, and in one or more embodiments may be represented by the formula $Cu_xMn_yV_zO_w \cdot nH_2O$, wherein "$nH_2O$" represents the structural and/or surface water present in the cathode material. In the cathode material, the copper may have an oxidation state between about 1 and about 3; (ii) the manganese therein may have an oxidation state between about 2 and about 7; (iii) the vanadium therein may have an oxidation state between about 2 to about 5; (iv) x, y, and z each may have a value greater than zero; (v) the sum of x+y+z is between about 1 and about 3; and (vi) w may have a value greater than zero that may be experimentally determined and that is consistent with the values of x, y, and z and the oxidation states of copper, manganese, and vanadium.

The copper manganese vanadium oxide cathode material may have an average density of about 4 g/cm$^3$, about 4.5 g/cm$^3$, about 5 g/cm$^3$, about 5.5 g/cm$^3$, about 6 g/cm$^3$, or more (the density ranging for example from about 4 g/cm$^3$ to about 6 g/cm$^3$, or about 4.5 g/cm$^3$ to about 4.5 g/cm$^3$). Additionally, or alternatively, the cathode material may have a surface area (as determined using means generally known in the art, including, for example, the BET method) of at least about 25 m$^2$/g, of at least about 45 m$^2$/g, about 90 m$^2$/g, about 100 m$^2$/g, about 125 m$^2$/g, or more. In one or more embodiments the cathode material may have a BET surface within the range of, for example, about 25 to about 125 m$^2$/g, or about 75 to about 125 m$^2$/g (the surface area decreasing as the material becomes more crystalline).

In addition to the copper manganese vanadium oxide cathode material detailed herein, the other components of the non-aqueous electrochemical cell may be selected from among those generally known in the art. For example, according to various embodiments, the cathode may also include a binder, for example, a polymeric binder such as polytetrafluoroethylene (PTFE) or polyvinylidene fluoride (PVDF), which may optionally be in powdered form. Additionally, carbon materials such as carbon black (e.g., Super P, from Timcal), natural and synthetic graphite, as well as their various derivatives (including graphene, graphite nanoplatelet, expanded graphite—such as KS4, from Timcal), carbon nano-fibers, and non-graphitic forms of carbon, such as coke, charcoal, or activated carbon, may be used as conductive fillers in the cathodes.

In embodiments the cathode material may additionally comprise a carbonaceous active material, and may include graphitic materials such as natural and synthetic graphite and all their derivatives including graphene, graphite nanoplatelet, expanded graphite, carbon nano-fiber and non-graphitic forms of carbon such as coke, charcoal, or activated carbon. In embodiments, the carbonaceous material may be prepared from carbon and fluorine (i.e., it is a fluorinated carbon material). The fluorinated carbon material may generally be represented by the formula $(CF_x)_n$, wherein x typically varies between about 0.1 to 1.9, such as between about 0.4 and 1.2, and between about 0.6 and 1.0. The fluorinated carbon may also be a mixture of $(CF_{x1})_n$ and $(CF_{x2})_m$, where x1 may be about 0.8 to 1.2, and x2 may be about 0.4 to 0.8. In the formulas $(CF_x)_n$, $(CF_{x1})_n$, and $(CF_{x2})_m$, n and m refer to the number of monomer units, which can vary widely, but may be, for example, within the range of about 1 to about 5. Accordingly, the ratio of $(CF_{x1})$ to $(CF_{x2})$ may be, for example, between about 5:1 and about 1:5, about 4:1 and about 1:4, about 3:1 and about 1:3, about 2:1 and about 1:2, or about 1:1. Stated another way, the cathode material, in various embodiments, may contain a mixture of $CF_x$, such as for example a mixture of $CF_1/CF_{0.6}$, wherein the mixture contains, for example, about 90% $CF_1$ and about 10% $CF_{0.6}$, about 80% $CF_1$ and about 20% $CF_{0.6}$, about 75% $CF_1$ and about 25% $CF_{0.6}$, about 67% $CF_1$ and about 33% $CF_{0.6}$, about 50% $CF_1$ and about 50% $CF_{0.6}$, and vice versa.

The respective concentrations of copper manganese vanadium oxide and/or fluorinated carbon present in the cathode material may be optimized for a given application or use, by means generally known in the art. In one embodiment the cathode mixture may comprise from between about 60% to about 95% by weight of the fluorinated carbon, and some embodiments may comprise from between about 65% to about 90%, or about 70% to about 85% by weight. Additionally, the cathode mixture may comprise from between about 5% to 40% by weight of the copper manganese vanadium oxide, and some embodiments may comprise from between about 10% and about 35%, or about 15% and about 30% by weight. However, such concentrations should not be viewed in a limiting sense. For example, in embodiments the copper manganese vanadium oxide may be the major component of the cathode material (rather than, for example, the fluorinated carbon).

In various embodiments the cathode material may be non-lithiated. Stated another way, the cathode material may be prepared such that, at least initially (i.e., prior to use), the cathode material may be essentially free of lithium or lithium ions (i.e., lithium or lithium ions are not intentionally added as a component of the cathode material during preparation). In embodiments, the cathode materials consist essentially of copper manganese vanadium oxide, fluorinated carbon, and, optionally, a binder material and/or a conductive additive (both further detailed below). For example, in embodiments, the cathode material comprises or consists essentially of, by weight, about 81% of the fluorinated carbon and about 12% of the copper manganese vanadium oxide, about 3% binder material, and about 4% conductive additive. However, such cathode materials may also be utilized in an electrochemical cell with a lithium (Li) anode, for primary (non-rechargeable) or secondary (rechargeable) batteries. As a result, in use of the electrochemical cell, lithium or lithium ions may be present in such a cathode material. The presence of such lithium or lithium ions in use of the electrochemical cell should therefore not be viewed in a limiting sense.

The electrochemical cell may additionally comprise an anode, which may essentially comprise any anode material suitable for use in non-aqueous electrochemical cells. The anode may comprise a metal selected from Group IA or Group IIA of the Periodic Table of Elements, including, for example, lithium, magnesium, sodium, potassium, etc., and their alloys and intermetallic compounds, including, for example, Li—Mg, Li—Al, Li—Al—Mg, Li—Si, Li—B, and Li—Si—B alloys and intermetallic compounds. The form of the anode may vary, but it may be made as a thin foil of the anode metal, and a current collector having an extended tab or lead affixed to the anode foil.

The electrochemical cell may further include a non-aqueous, ionically conductive electrolyte, which serves as a path for migration of ions between the anode and the cathode electrodes during electrochemical reactions of the cell. The electrolyte may be in either liquid state or solid state, or both. The electrochemical reaction at the electrodes involves conversions of ions in atomic or molecular forms that migrate from the anode to the cathode. Thus, non-aqueous electrolytes may be substantially chemically inert to the anode and cathode materials. Furthermore, an electrolyte in liquid state may exhibit physical properties that are beneficial for ionic transport (e.g., low viscosity, low surface tension, and/or good wettability).

The various components of the electrolyte may be selected from among those generally known in the art, which are suitable for use in combination with the cathode materials detailed elsewhere herein. In embodiments, the electrolyte may have an inorganic, ionically conductive salt dissolved in a non-aqueous solvent (or solvent system, when a mixture of solvents is used). The electrolyte may include an ionizable alkali metal salt dissolved in an aprotic organic solvent or a mixture of solvents comprising a low viscosity solvent and a high permittivity solvent. Without being held to any particular theory, the inorganic, ionically conductive salt is believed to serve as the vehicle for migration of the anode ions to react with the cathode active material. Accordingly, the ion-forming alkali metal salt may be similar to the alkali metal comprising the anode.

In one embodiment, for the electrolyte, the ionically conductive salt may have the general formula $MM'F_6$ or $MM'F_4$, wherein M may be an alkali metal that is the same as at least one of the metals in the anode and M' may be an element selected from the group consisting of phosphorous, arsenic, antimony, and boron. Salts suitable for obtaining the formula $M'F_6$ include, for example, hexafluorophosphate ($PF_6$), hexafluoroarsenate ($AsF_6$), and hexafluoroantimonate ($SbF_6$), while salts suitable for obtaining the formula $M'F_4$ include, for example, tetrafluoroborate ($BF_4$). Alternatively, the corresponding sodium or potassium salts may be used. Thus, for a lithium anode, the alkali metal salt of the electrolyte may optionally be selected from, for example, $LiPF_6$, $LiAsF_6$, $LiSbF_6$ and $LiBF_4$, as well as mixtures thereof. Other salts that may be useful with a lithium anode include, for example, $LiClO_4$, $LiAlCl_4$, $LiGaCl_4$, $LiC(SO_2CF_3)_3$, $LiB(C_6H_4O_2)_2$, $LiN(CF_3SO_2)_2$, and $Li(CF_3SO_3)$, as well as mixtures thereof.

Low-viscosity solvents that may be used in the electrochemical cell include, for example: dimethyl carbonate (DMC); diethyl carbonate (DEC); 1,2-dimethoxyethane (DME); tetrahydrofuran (THF); methyl acetate (MA); diglyme; triglyme; tetraglyme; and high permittivity solvents, including, for example, cyclic carbonates, cyclic esters, and cyclic amides (such as propylene carbonate (PC), ethylene carbonate (EC), acetonitrile, dimethyl sulfoxide (DMS), dimethyl formamide, dimethyl acetamide, gamma-butyrolactone (GBL), and N-methyl-pyrrolidinone (NMP)), as well as various mixtures or combinations thereof.

The type and composition of the solvent used in the electrolyte, and/or the type and concentration of a salt present therein, may be selected in order to optimize one or more physical and/or performance properties of the electrochemical cell of the present disclosure. For example, in one or more embodiments, the concentration of the salt in the electrolyte may be in the range of from about 0.5M to about 2.5M, from about 0.75M to about 2.25M, or from about 1M to about 2M. In embodiments where a mixed solvent system is employed, the ratio (by volume) may range, for example, from between about 1:9 and about 9:1 of a first solvent (e.g., a carbonate solvent, such as propylene carbonate) and a second solvent (e.g., a substituted alkane solvent, such as 1,2-dimethoxylethane); that is, the solvent system may comprises from about 10 volume % to about 90 volume %, from about 20 volume % to about 80 volume %, or from about 30 volume % to about 70 volume %, of a first solvent, all or substantially all of the balance of the solvent system being the second solvent. In embodiments, the anode may be lithium metal and the electrolyte may be 1.0M to 1.8M $LiBF_4$ in a mixed PC/DME solvent system (the concentration of the solvent system being between about 10 volume % PC/90 volume % DME and about 70 volume % PC/90 volume % DME).

An electrochemical cell additionally may comprise a suitable separator material, which is selected to separate the cathode/cathode material from the Group IA or IIA anode/anode material, to prevent internal short circuit conditions. The separator may be selected from materials known in the art to be electrically insulating (and sometimes ionically conductive), chemically non-reactive with the anode and cathode active materials, and both chemically non-reactive with and insoluble in the electrolyte. In addition, the separator material may be selected such that it may have a degree of porosity sufficient to allow flow through of the electrolyte during the electrochemical reaction of the cell. Finally, the separator material may be selected to have a thickness ranging from, for example, about 15 microns to about 75 microns, or about 20 microns to about 40 microns.

Accordingly, suitable separator materials may include, or may be selected from, porous or nonporous polymer membranes, such as for example: polypropylene, polyethylene, polyamide (e.g., nylon), polysulfone, polyvinyl chloride (PVC), and similar materials, and combinations thereof (e.g., a trilayer membrane, such as a trilayer membrane of polypropylene/polyethylene/polypropylene), as well as fabrics woven from fluoropolymeric fibers, including for example polyvinylidine fluoride (PVDF), polyvinylidine fluoride-cohydrofluorpropylene (PVDF-HFP), tetrafluoroethylene-ethylene copolymer (PETFE), chlorotrifluoroethylene-ethylene copolymer, and combinations thereof. Fabrics woven from these fluoropolymeric fibers may be used either alone or laminated a microporous film (e.g., a fluoropolymeric microporous film.).

A form or configuration of the electrochemical cell may generally be selected from those known in the art. In embodiments, the form or configuration of the electrochemical cell may be a case-negative design, wherein the cathode/anode/separator/electrolyte components are enclosed in a conductive metal casing such that the casing may be connected to the anode current collector in a case-negative configuration, although case-neutral design may also be suitable. A material for the casing may be titanium, although stainless steel, nickel, and aluminum are also suitable. The casing header comprises a metallic lid having a sufficient number of openings to accommodate the glass-to-metal seal/terminal pin feed through for the cathode electrode. The anode electrode may be connected to the case. An additional opening may be provided for electrolyte filling. The casing header may comprise elements that are compatible with the other components of the electrochemical cell and is resistant to corrosion. The cell may thereafter be filled with the electrolyte solution described hereinabove and hermetically sealed, such as by welding a stainless steel plug over the fill hole. The cell may alternatively be constructed in a case-positive design. Accordingly, the description provided herein should not be viewed in a limiting sense.

Other components of the electrochemical cell (e.g., current collectors, etc.) may be selected from among those components generally known in the art, without departing from the scope of the present disclosure.

Once the cathode material has been prepared, it may be deposited on the cathode current collector in the form of single, substantially homogenous mixture (e.g., wherein copper manganese vanadium oxide particulate is dispersed into $CF_x$ particulate, or vice versa, depending on which is the major component and which is the minor component of the cathode material, and then this mixture may be deposited in the form of a single layer on the cathode current collector). Alternatively, however, when a mixture of cathode components or materials are used, these materials may be deposited in the form of layers on (i) the same side of the current collector (e.g., a layer of copper manganese vanadium oxide deposited on the surface of the current collector, then a layer of $CF_x$ may be deposited on the copper manganese vanadium oxide layer, or vice versa), or (ii) the opposite sides of the current collector.

It is to be noted that, unless otherwise stated, the various concentrations, concentration ranges, ratios, etc. recited herein, are provided for illustration purposes only and therefore should not be viewed in a limiting sense. Also all various combinations and permutations of compositions, concentrations, ratios, components, etc. are intended to be within the scope of and supported by the present disclosure.

2. Cathode Material Preparation

Copper manganese vanadium oxide cathode material may be prepared by means generally known in the art, involving, for example, the chemical reaction of various copper, vanadium, and manganese salts or oxides of both metals, either by solid state reactions or by wet chemistry (including, for example, thermal treatment, sol-gel formation, and hydrothermal synthesis in mixed states).

In embodiments, the copper manganese vanadium oxide material may be prepared in a way that provides or yields the material in an amorphous or crystalline form or state. For example, such copper manganese vanadium oxide material may be prepared by a co-precipitation process in the presence or absence of an oxidizing agent, such as potassium persulfate or potassium perchlorate, of copper salts, vanadium salts, and manganese salts, by a precipitating agent such as potassium hydroxide, lithium hydroxide, or sodium carbonate. Alternatively, the cathode material may be the product of the thermal decomposition of copper salts, vanadium salts and manganese salts in an appropriate environment. The materials thereby produced may contain copper manganese vanadium oxide, or a combination or mixture thereof.

Once prepared, the resulting copper manganese vanadium oxide may be obtained in the form of particulate (either directly, or after a milling or grinding step of some kind) having an average particle size ranging from about 10 nanometers to about 150 nanometers, or from about 80 nanometers to about 300 nanometers. Optionally, the particulate may be agglomerated to form larger particles, having, for example, an average particle size of ranging from about 5 to about 15 microns, or from about 7 to about 45 microns.

The following examples describe a process of manufacturing an electrochemical cell according to various embodiments. These are several illustrations among numerous varieties. Therefore, these examples do not in any way limit the content of the present invention.

EXAMPLES

Example 1

$Cu_xMn_yV_zO_w$ was prepared as follows:
$CuSO_4 \cdot 5H_2O$ (0.25 moles), $VOSO_4 nH_2O$ (0.25 moles) and $MnSO_4 \cdot H_2O$ (0.125 moles) were dissolved in an appropriate amount of deionized water to form a solution. Potassium hydroxide solution (10%) was added drop-wise to adjust the pH of the stirred solution of vanadyl, copper and manganese sulfate to 8. The resulting precipitate was collected by filtration and dried at 60° C. for about 24 hours. In some cases, the resulting precipitate was washed with deionized water after drying or calcination. The dried material was then placed in an oven and heated in air at approximately 250° C. for about 15 hours. Finally, the material was further calcinated at 400° C. for about 2 hour and after cooling down to room temperature, it was ground using mortar and pestle and sieved through a sieve of 60-micron mesh.

Example 2

$Cu_xMn_yV_zO_w$ was prepared as follows:
$CuSO_4 \cdot 5H_2O$ (0.16 moles), $VOSO_4 nH_2O$ (0.16 moles), $MnSO_4 \cdot H_2O$ (0.04 moles) and $K_2S_2O_8$ (0.20 moles) were dissolved in an appropriate amount of deionized water to form a solution. Then, the pH of the resulting solution was adjusted to 8 by adding drop wise a solution of 5% KOH. When the procedure was completed, the precipitate was aged at room temperature in mother liquor for about 4 hours while stirring. The aged precipitate was filtered, washed with distilled water and dried at about 60° C. for approximately 24 hours. In some cases, the resulting precipitate was washed with deionized water after drying or calcination. Prior to being used as a cathode active material, the dried sample was heat-treated at approximately 250° C. for up to 24 hours.

Example 3

$Cu_xMn_yV_zO_w$ was prepared as follows:
$CuSO_4.5H_2O$ (0.16 moles), $VOSO_4nH_2O$ (0.16 moles), $MnSO_4.H_2O$ (0.02 moles) and $(NH_3)_2S_2O_8$ (0.18 moles) were dissolved in an appropriate amount of deionized water to form a solution. Then, the pH of the resulting solution was adjusted to 8 by adding drop wise solution of 5% LiOH. When the procedure was completed, the precipitate was aged at room temperature in mother liquor for about 4 hours while stirring. The aged precipitate was filtered and dried at about 60° C. for approximately 24 hours. In some cases, the resulting precipitate was washed with deionized water after drying or calcination. Prior to being used as a cathode active material, the dried sample was heat-treated at approximately 250° C. for up to 24 to 72 hours, or 400° C. for approximately two hours. Optionally, the dried sample may be heat-treated at approximately 250° C. for about 15 hours. The X-ray diffraction of as prepared material revealed a crystalline product as illustrated in FIG. 1.

Example 4

$Cu_xMn_yV_zO_w$ was prepared as follows:
$CuSO_4.5H_2O$ (0.24 moles), $VOSO_4nH_2O$ (0.16 moles) and $MnSO_4.H_2O$ (0.02 moles) and $K_2S_2O_8$ (0.18 moles) were dissolved in an appropriate amount of deionized water to form a solution. Then, the pH of the resulting solution was adjusted to 8 by adding drop wise solution of 10% KOH. The resulting precipitate was collected by filtration and dried at 60° C. for 24 hours. In some cases, the resulting precipitate was washed with deionized water after drying or calcination. Prior to being used as a cathode active material, the dried sample was heat-treated at approximately 250° C. and 400° C. for about 15 hours and 2 hours, respectively. Finally, the product was ground using mortar and pestle and sieved through a sieve of 60-micron mesh.

$Cu_xMn_yV_zO_w$ materials from precursors containing different Cu:Mn:V molar ratios other than 1.5:1:0.125 may be prepared using the above-described methods.

Example 5

$Cu_xMn_yV_zO_w$ was prepared as follows:
$CuSO_4.5H_2O$ (0.25 moles), $MnSO_4.H_2O$ (0.25 moles), $VOSO_4nH_2O$ (0.25 moles) and $(NH_3)_2S_2O_8$ (0.5 moles) were dissolved in an appropriate amount of deionized water to form a solution. Then, the pH of the resulting solution was adjusted to 8 by adding drop wise solution of 10% KOH. When the procedure was completed, the precipitate was aged at room temperature in mother liquor for about 4 hours while stirring. The aged precipitate was filtered and dried at about 60° C. for approximately 24 hours. In some cases, the resulting precipitate was washed with deionized water after drying or calcination. Prior to being used as a cathode active material, the dried sample was heat-treated at approximately 250° C. and 400° C. for about 15 hours and 2 hours, respectively.

Example 6

$Cu_xMn_yV_zO_w$ was prepared as follows:
$CuSO_4.5H_2O$ (0.5 moles), $MnSO_4.H_2O$ (0.25 moles), $VOSO_4nH_2O$ (0.16 moles) and $(NH_3)_2S_2O_8$ (0.38 moles) were dissolved in an appropriate amount of deionized water to form a solution. Then, 10% LiOH solution was added drop wise to the stirred solution until the pH of about 8 was reached, at which point precipitation of product is completed. When the procedure was completed, the precipitate was aged at room temperature in mother liquor for about 4 hours while stirring. The aged precipitate was filtered and dried at about 60° C. for approximately 24 hours. In some cases, the resulting precipitate was washed with deionized water after drying or calcination. Prior to being used as a cathode active material, the dried sample was heat-treated at approximately 250° C. and 400° C. for about 15 hours and 2 hours, respectively.

Example 7

$Cu_xMn_yV_zO_w$ was prepared as follows:
A sample of $Cu_xMn_yV_zO_w$ was prepared as set forth in Example 5, except the precipitating agent was potassium hydroxide.

Example 8

$Cu_xMn_yV_xO_w$ was prepared as follows:
A sample of $Cu_xMn_yV_zO_w$ was prepared as set forth in Example 5, except the oxidizing agent was a mixture of $K_2S_2O_8$ and $(NH_3)_2S_2O_8$ with a molar ratio of 1:1

Electrochemical Testing of $Cu_xMn_yV_zO_w$ Using Test Cell

Figure 2:
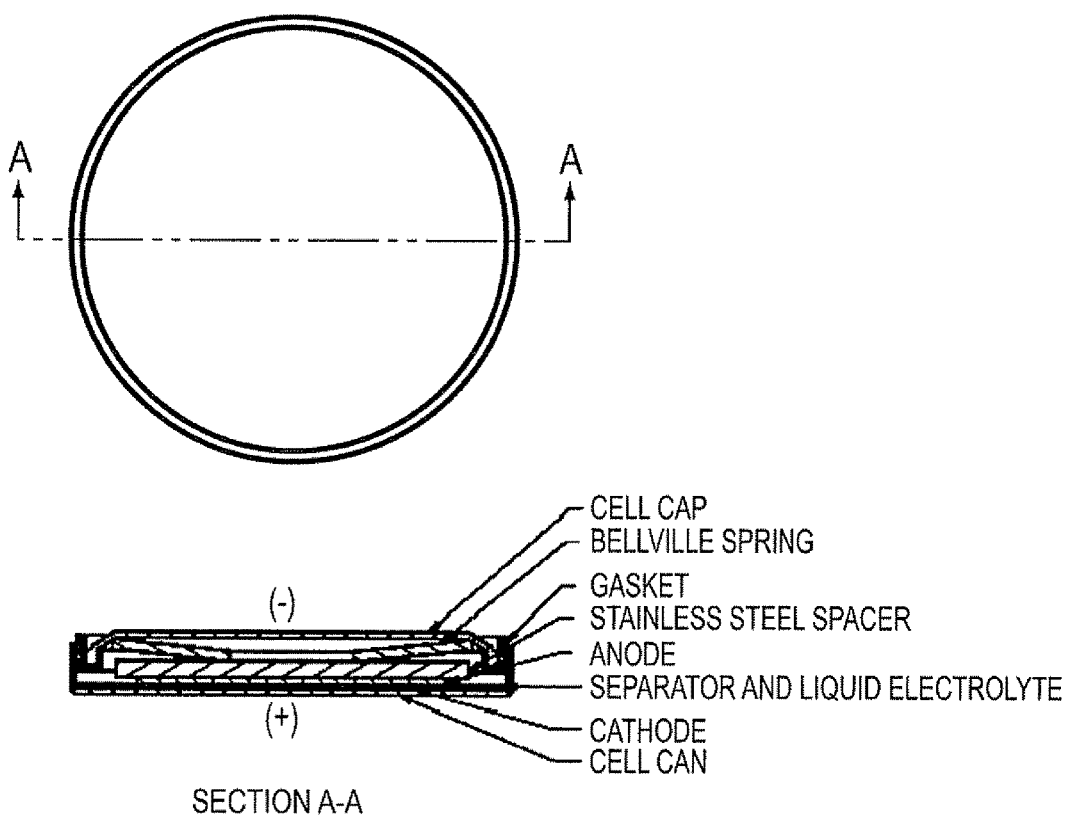
FIG. 2 illustrates an electrochemical test cell.

An exemplary coin cell battery as shown in FIG. 2 was used as a test vehicle to evaluate the discharge characteristics of a cathode that comprises $Cu_xMn_yV_zO_w$. With reference to FIG. 2, an exemplary test cell comprises a cell can, a cathode, separator, non-aqueous electrolyte, stainless steel spacer, gasket, Belleville spring, cell cap, and an anode. The cell may be used either as a rechargeable or non-rechargeable electrochemical cell. Anode, cathode, separator, and the electrolyte are configured to be contained within cell can and cell cap. Other electrochemical cells according to various embodiments may be of any configuration, such as a cylindrical wound cell, a prismatic cell, a rigid laminar cell, or a flexible pouch, envelope, or bag.

The electrochemical behavior of the $Cu_xMn_yV_zO_w$ of Example 2 was evaluated in a 2325 size coin cell, constructed consistent with the details provided above, using lithium metal as an anode. The cathode consisted of 70% $Cu_xMn_yV_zO_w$ as active material, 20% Carbon black, 5% KS4 graphite as conductive fillers, and 5% PTFE as binder. $Cu_xMn_yV_zO_w$ and KS4 were first mixed using mortar pestle. Then PTFE powder was added to the resulting mix while mixing to form a cathode sheet. The electrode was cut from the resulting sheet with a die. Prior to testing in 2325 size coin cells, the cathodes were vacuum dried at 120° C. for 4 hours. The measurements were carried out at room temperature under galvanostic conditions using Arbin tester system.

Figure 3:
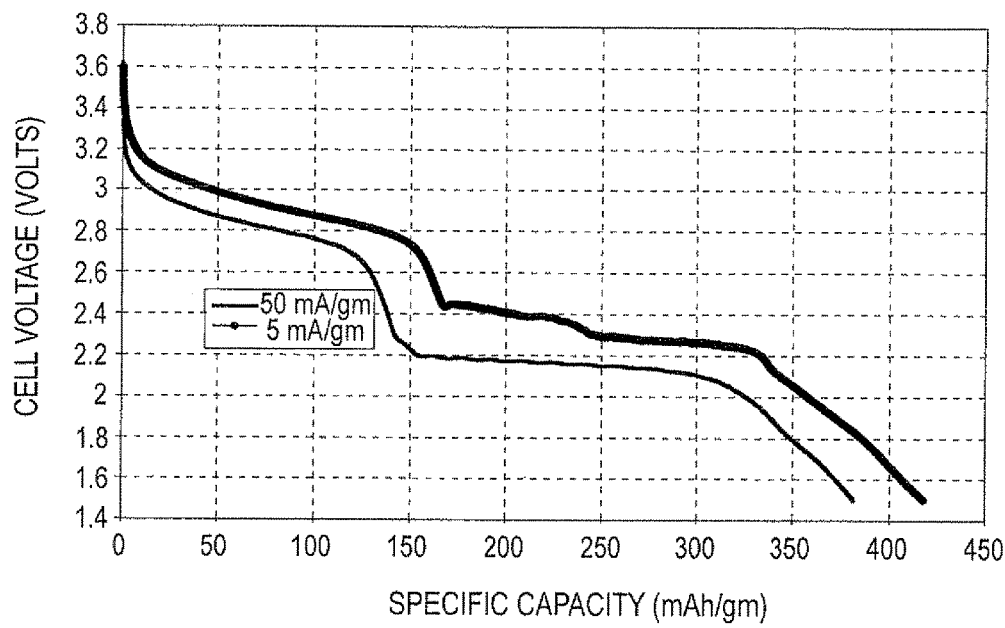
FIG. 3 illustrates a discharge profile of CuMnVO of Example 2.

FIG. 3 shows the discharge profile of $Cu_xMn_yV_zO_w$ of the Example 2 cathode material discussed above in a coin cell using lithium metal as an anode. The measurements were carried out at room temperature under galvanostic conditions at a discharge rate of 5 and 50 milliamps per gram (mA/g) of cathode active material, respectively. The cell delivered a specific discharge capacity to 1.5 Volts at 5 mA/gm of about 420 mAh/gm whereas at 50 mA/gm, it was of about 390 mAh/gm.

Figure 4:
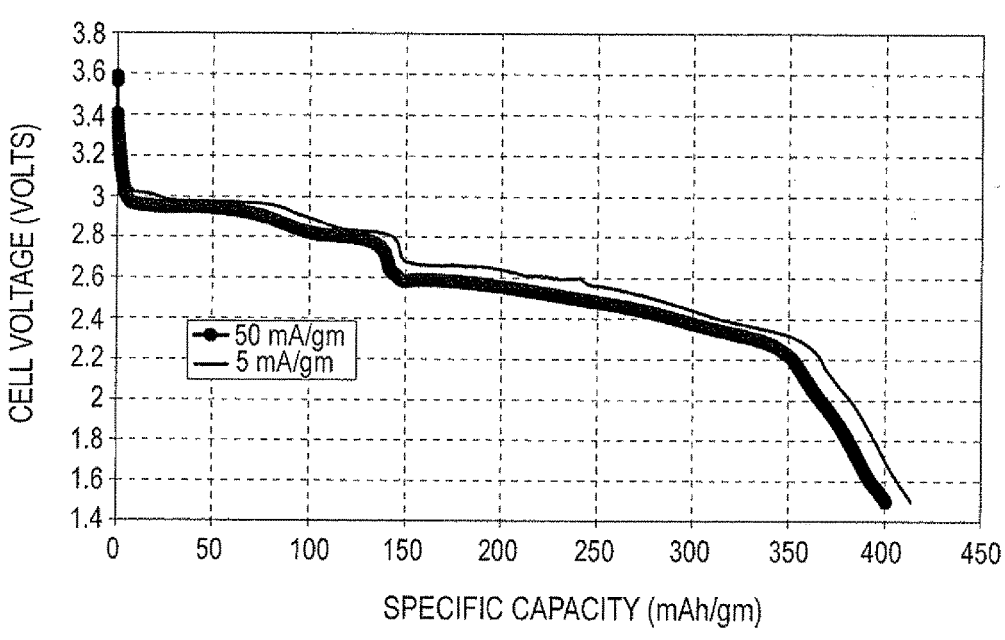
FIG. 4 illustrates a discharge profile of CuMnVO of Example 3.

Discharge performance in coin cell of $Cu_xMn_yV_zO_w$ material of the Example 3 using lithium metal as an anode is illustrated in FIG. 4. The measurements were carried out at room temperature under galvanostic conditions at a discharge rate of 5 and 50 milliamps per gram (mA/g) of cathode active material, respectively. The cells delivered a specific discharge capacity to 1.5 Volts at 5 mA/gm of about 420 mAh/g whereas at 50 mA/gm, it was about 390 mAh/gm.

The theoretical capacity of the electrode was calculated assuming a reduction of tetravalent manganese to the trivalent state, reduction of pentavalent vanadium to the trivalent state and reduction of divalent copper to monovalent state. From the above assumption, the formula of the electrode compound of Example 3 was derived and found to be $CuV_{0.6}Mn_{0.1}O_{2.7}$, which offered the specific theoretical capacity of 430 mAh/gm.

Electrode with $Cu_xMn_yV_zO_w$ and $CF_x$

As previously noted, in embodiments, the cathode material may comprise $Cu_xMn_yV_zO_w$ combined with one or more other cathode materials that have high specific capacity, such as fluorinated carbon (e.g., $CF_x$). A battery with a cathode that comprises $Cu_xMn_yV_zO_w$ and $CF_x$ may exhibit enhanced electrochemical performance (e.g., specific energy, energy density, operating voltage, and rate capability) relative to a battery with $CF_x$ alone.

In embodiments, $Cu_xMn_yV_zO_w$ formed according to Example 3 above was mixed with fluorinated carbon, and more specifically $CF_1$, to form a cathode. The cathode active part of the blend consisting of 50% (by weight) carbon fluoride and 50% (by weight) $Cu_xMn_yV_zO_w$ were mixed with Super P, KS4 and Teflon powder.

Figure 5:
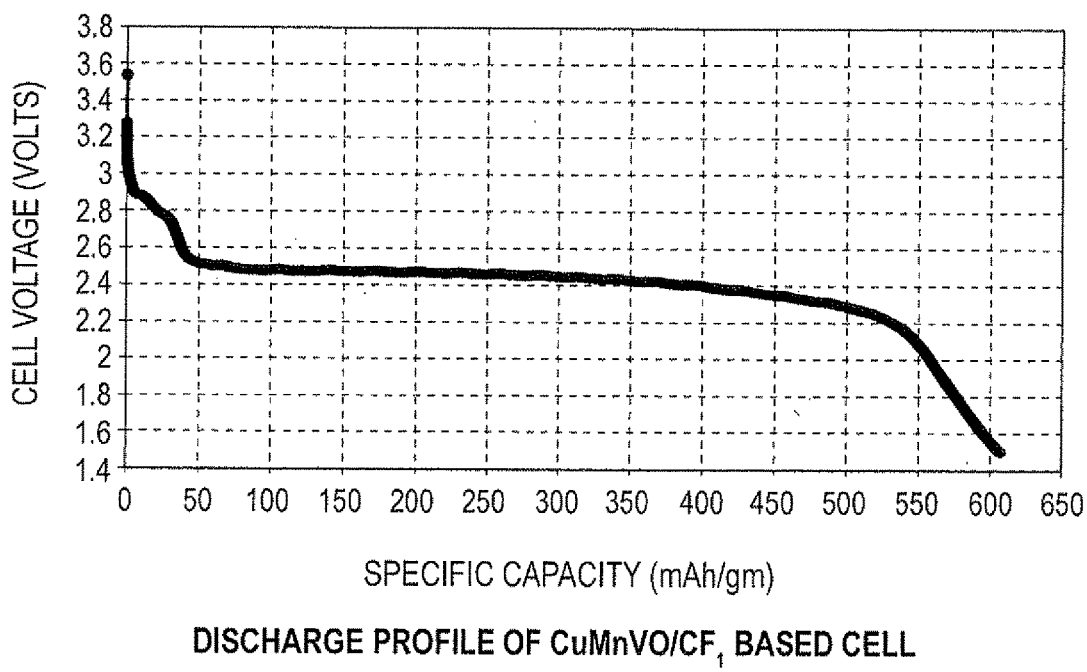
FIG. 5 illustrates a discharge profile of CuMnVO/$CF_1$ based cell.
Figure 6:
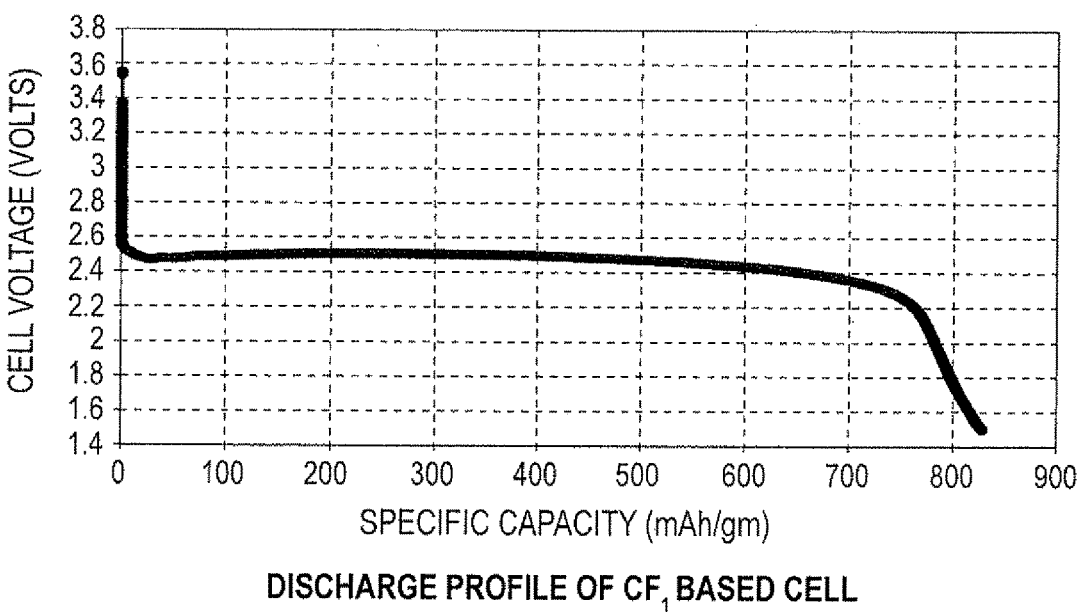
FIG. 6 illustrates a discharge profile of a $CF_1$ based cell.

The discharge profile of the cell built with the cathode prepared from the noted cathode mixture at a discharge rate of 50 milliamps per gram is illustrated in FIG. 5. Discharge data for cells built with carbon fluoride alone as active material are provided in FIG. 6 for comparison. The specific capacity to 1.5 Volts of cells built with the admixture of carbon fluoride and $Cu_xMn_yV_zO_w$ as cathode materials is about 600 mAh/g. When evaluated alone, carbon fluoride based cells delivered a specific capacity to 1.5 Volts of about 820 mAh/g. As can be seen from FIG. 6, high voltage part observed at the beginning of the discharge of the admixture cathode active material is attributed to CuMnVO.

It is to be noted that the mixture of 50% $CF_1$, having an expected capacity of about 410 mAh/g, and 50% $Cu_xMn_yV_zO_w$, having an expected capacity of about 200 mAh/g, should have produced a hybrid cathode delivering a capacity of about 610 mAh/g. It is anticipated that the cell made with the admixture of $CF_1$ and $Cu_xMn_yV_zO_w$ cathode will generate less heat during discharge while compared to 100% $CF_1$ cell alone.

What is claimed is:

1. A non aqueous electrochemical cell comprising:
   an anode;
   an electrolyte; and
   a cathode comprising $CuMn_{0.6}V_{0.1}O_{2.7}$ and fluorinated carbon.

2. The non aqueous electrochemical cell according to claim 1, wherein the cathode material is $CuMn_{0.6}V_{0.1}O_{2.7} \cdot nH_2O$,
   wherein:
   $nH_2O$ represents the surface water, the structural water, or both present in $CuMn_{0.6}V_{0.1}O_{2.7}$.

3. The non aqueous electrochemical cell according to claim 1, wherein the $CuMn_{0.6}V_{0.1}O_{2.7}$ has an average density of about 4 $g/cm^3$ to about 6 $g/cm^3$.

4. The non aqueous electrochemical cell according to claim 1, wherein the $CuMn_{0.6}V_{0.1}O_{2.7}$ has a surface area of about 25 $m^2/g$ to about 125 $m^2/g$.

5. The non aqueous electrochemical cell according to claim 1, wherein the fluorinated carbon is represented by the formula $(CF_x)_n$, wherein
   x is from about 0.1 to about 1.9, and
   n is from about 1 to about 5.

6. The non aqueous electrochemical cell according to claim 1, wherein the fluorinated carbon is a mixture of fluorinated carbons having the formulae $(CF_{x1})_n$ and $(CF_{x2})_m$, wherein
   x1 is from about 0.8 to about 1.2,
   x2 is from about 0.4 to about 0.8, and
   n and m are each from about 1 to about 5.

7. The non aqueous electrochemical cell according to claim 6, wherein the ratio of $(CF_{x1})_n$ to $(CF_{x2})_m$ is from about 1:5 to about 5:1.

8. The non aqueous electrochemical cell according to claim 1, wherein the concentration of fluorinated carbon by weight in the cathode is between 1% to about 99%, and the concentration of $CuMn_{0.6}V_{0.1}O_{2.7}$ by weight in the cathode is between 99% and 1%.

9. The non aqueous electrochemical cell according to claim 1, wherein the anode comprises a Group IA metal, a Group IIA metal, or mixtures thereof.

10. The non aqueous electrochemical cell according to claim 9, wherein the anode comprises one selected from the group consisting of lithium, magnesium, sodium, potassium, lithium-magnesium, lithium-aluminum, lithium-aluminum-magnesium, lithium-silicon, lithium-boron, and lithium-silicon-boron.

11. The non aqueous electrochemical cell according to claim 1, wherein the electrolyte comprises:
    an ionizable alkali metal salt; and
    an aprotic organic solvent or mixture of solvents.

12. The non aqueous electrochemical cell according to claim 11, wherein the aprotic organic solvent or mixture of solvents is selected from the group consisting of dimethyl carbonate; diethyl carbonate; 1,2-dimethoxyethane; tetrahydrofuran; methyl acetate; diglyme; triglyme; tetraglyme; high permittivity solvents; and mixtures thereof.

13. The non aqueous electrochemical cell according to claim 11, wherein the ionizable alkali metal salt in the electrolyte is present in a range from about 0.5M to about 2.5M.

14. The non aqueous electrochemical cell according to claim 1, further comprising a separator.

15. The non aqueous electrochemical cell according to claim 14, wherein the separator has a thickness in the range of about 15 microns to about 75 microns.

16. The non aqueous electrochemical cell according to claim 14, wherein the separator is selected from the group consisting of polypropylene; polyethylene; polyamide; polysulfone; polyvinyl chloride; and mixtures thereof.

17. The non aqueous electrochemical cell according to claim 14, wherein the separator is a fabric woven from fluoropolymeric fibers selected from the group consisting of polyvinylidine fluoride; polyvinylidine fluoride-cohydrofluorpropylene; tetrafluoroethylene-ethylene copolymer; chlorotrifluoroethylene-ethyl ene copolymer, and combinations thereof.

* * * * *